United States Patent
Alt et al.

(10) Patent No.: US 7,119,986 B2
(45) Date of Patent: Oct. 10, 2006

(54) SEPARATOR PLATE WITH HEAD LOAD/UNLOAD

(75) Inventors: Robert A. Alt, Longmont, CO (US); E. Paul Lee, Boulder, CO (US); Matthew R. Lepore, Thornton, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/817,278

(22) Filed: Apr. 1, 2004

(65) Prior Publication Data

US 2005/0219739 A1    Oct. 6, 2005

(51) Int. Cl.
G11B 17/02    (2006.01)
G11B 5/54    (2006.01)

(52) U.S. Cl. .................. 360/97.02; 360/254.7
(58) Field of Classification Search ...................... None
See application file for complete search history.

(56) References Cited

U.S. PATENT DOCUMENTS

| | | | |
|---|---|---|---|
| 4,452,092 A | 6/1984 | Dankwort | |
| 4,571,216 A | 2/1986 | Stieg et al. | |
| 4,843,288 A | 6/1989 | Volz et al. | |
| 4,949,201 A | 8/1990 | Abed | |
| 4,977,529 A | 12/1990 | Gregg et al. | |
| 5,189,574 A | 2/1993 | Imamura et al. | |
| 5,379,171 A | 1/1995 | Morehouse et al. | |
| 5,579,189 A | 11/1996 | Morehouse et al. | |
| 5,592,349 A | 1/1997 | Morehouse et al. | |
| 5,631,787 A | 5/1997 | Huang et al. | |
| 5,694,267 A | 12/1997 | Morehouse et al. | |
| 5,760,986 A | 6/1998 | Morehouse et al. | |
| 5,764,437 A | 6/1998 | Meyer et al. | |
| 5,835,303 A | 11/1998 | Morehouse et al. | |
| 5,867,340 A | 2/1999 | Morehouse et al. | |
| 5,898,545 A | 4/1999 | Schirle et al. | |
| 5,907,453 A | 5/1999 | Wood et al. | |
| 5,909,661 A | 6/1999 | Abramovitch et al. | |
| 5,940,240 A | 8/1999 | Kupferman | |
| 5,973,887 A | 10/1999 | Cameron | |
| 6,084,753 A | 7/2000 | Gillis et al. | |
| 6,097,568 A | 8/2000 | Ekhoff | |
| 6,134,071 A | 10/2000 | Andoh et al. | |
| 6,157,520 A | 12/2000 | Mangold et al. | |
| 6,181,528 B1 | 1/2001 | Reinhart et al. | |
| 6,292,333 B1 | 9/2001 | Blumentritt et al. | |
| 6,542,328 B1 | 4/2003 | Harrison et al. | |
| 6,549,365 B1 | 4/2003 | Severson | |
| 6,600,625 B1 | 7/2003 | Munninghoff et al. | |
| 6,930,857 B1 * | 8/2005 | Lin et al. | 360/97.02 |

* cited by examiner

*Primary Examiner*—Robert S. Tupper
(74) *Attorney, Agent, or Firm*—Leanne R. Taveggia; Westman, Champlin & Kelly, P.A.

(57) ABSTRACT

An apparatus provides improved positional control for an access element moveable adjacent a rotatable surface, such as a data transducing head adjacent a data recording surface of a data storage device. A circumferentially extending windage plate is adapted for placement adjacent the rotatable surface. The plate includes an edge surface configured to extend adjacent a movement path of an access element across the rotatable surface. The edge surface supports a ramp structure adapted to receivingly support the access element at a position away from the rotatable surface.

16 Claims, 3 Drawing Sheets

SEPARATOR PLATE WITH HEAD LOAD/UNLOAD

FIELD OF THE INVENTION

The claimed invention relates generally to the field of fluidic control devices and more particularly, but not by way of limitation, to an apparatus for controlling an access element adjacent a rotatable surface, such as a data transducing head and recording disc in a data storage device.

BACKGROUND

Digital data storage devices are used to store and retrieve large amounts of user data in a fast and efficient manner. A typical data storage device uses an actuator assembly to support an array of vertically aligned data transducing heads adjacent recording surfaces in a disc stack.

The disc stack is rotated at a relatively high rotational velocity by a spindle motor. An actuator motor (such as a voice coil motor, VCM) pivots the actuator assembly to align the transducers with data tracks defined on the recording surfaces to write data to the tracks and retrieve previously written data from the tracks. The heads are typically hydrodynamically supported adjacent the recording surfaces by fluidic currents established by rotation of the disc stack.

A continuing trend in the industry is to provide successive generations of data storage devices with smaller sizes and increased storage capacities and data transfer rates. There is therefore a continued need for improvements in the manner in which heads are positionally controlled, both during operation and when the device is deactivated. It is to such improvements that the claimed invention is generally directed.

SUMMARY OF THE INVENTION

Preferred embodiments of the present invention are generally directed to an apparatus which provides improved positional control for an access element moveable adjacent a rotatable surface, such as a data transducing head adjacent a data recording surface of a data storage device.

In accordance with some preferred embodiments, the apparatus generally comprises a circumferentially extending windage plate adapted for placement adjacent a rotatable surface. The plate includes an edge surface configured to extend adjacent a movement path of an access element across the rotatable surface. The edge surface supports a ramp structure adapted to receivingly support the access element at a position away from the rotatable surface.

In accordance with other preferred embodiments, the apparatus generally comprises a rotatable surface and an access element moveable along a movement path adjacent the rotatable surface. A stationary, circumferentially extending windage plate is disposed adjacent the rotatable surface and includes an edge surface disposed adjacent the movement path. A ramp structure supported by the edge surface receivingly supports the access element at a position away from the rotatable surface.

These and various other features and advantages which characterize the claimed invention will become apparent upon reading the following detailed description and upon reviewing the associated drawings.

DETAILED DESCRIPTION

Figure 1:
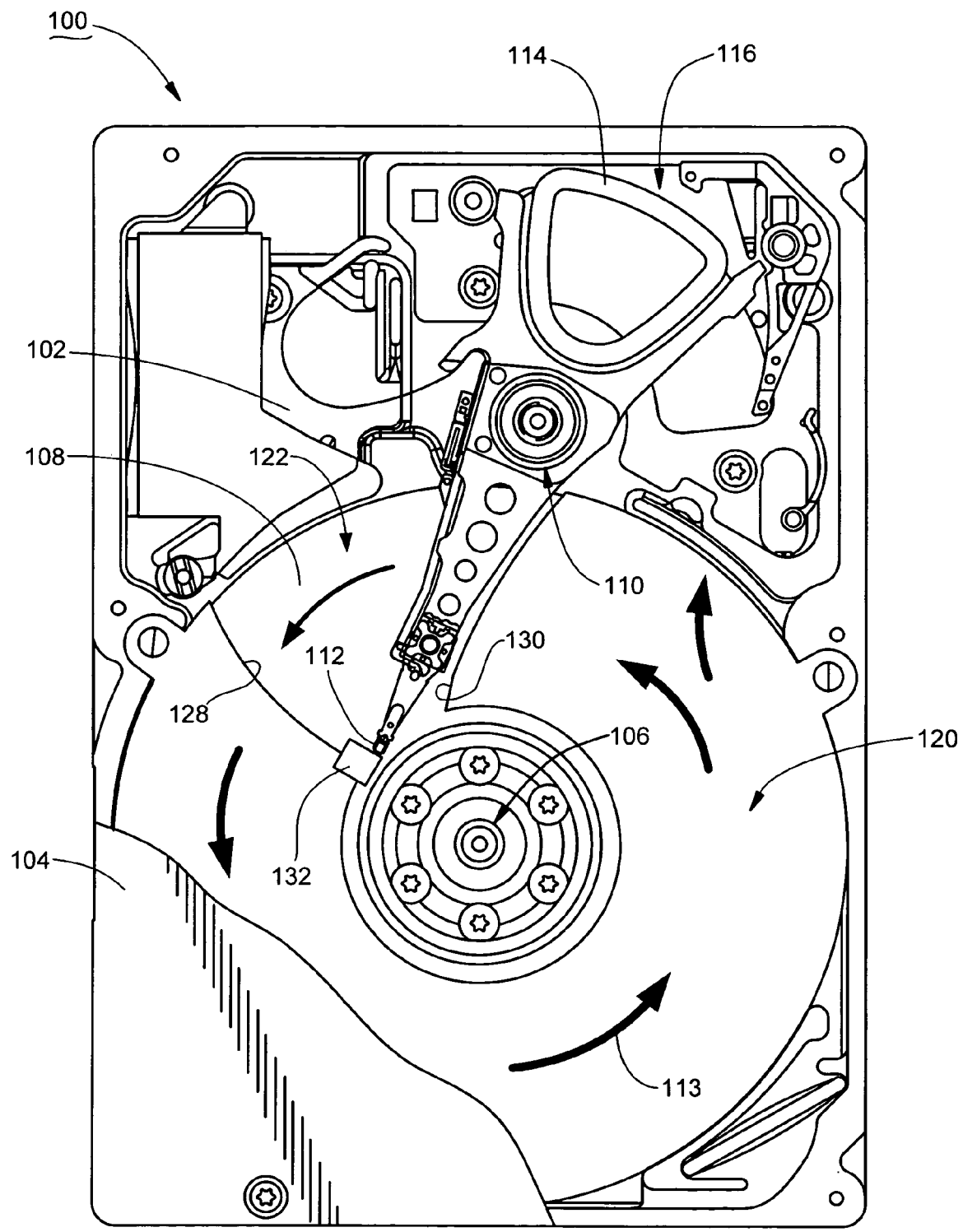
FIG. 1 is an exploded, perspective view of a data storage device which utilizes separator plates (windage plates) to effect head positioning control during operational and deactivated modes in accordance with preferred embodiments of the present invention.

While the claimed invention has utility in any number of different applications, FIG. 1 has been provided to illustrate a particularly suitable environment in which the claimed invention can be advantageously practiced.

FIG. 1 provides a top plan view of a data storage device 100 of the type configured to magnetically store and transfer digital data with a host device. The device 100 includes a base deck 102 which mates with a top cover 104 (shown in partial cut-away) to form a sealed housing.

A spindle motor 106 rotates a number of axially aligned, magnetic recording discs 108 at a constant high speed during device operation. An actuator assembly 110 supports a corresponding array of data transducing heads 112.

During operation, the heads 112 are hydrodynamically supported adjacent the disc surfaces by fluidic (air) currents 113 established by the high speed rotation of the discs 108. The currents 113 generally circulate along the direction of rotation of the discs 108 (in this case, counter-clockwise as depicted in FIG. 1).

Application of current to a coil 114 of a voice coil motor (VCM) pivots the actuator assembly 110, thereby causing the heads 112 to move radially across the disc surfaces to access data tracks (not shown) defined thereon.

A number of stationary separator plates 120 are interposed among and adjacent the various disc surfaces. The separator plates 120, also referred to as windage plates, are utilized to effect head positioning control during operational and deactivated modes of the device 100.

Figure 2:
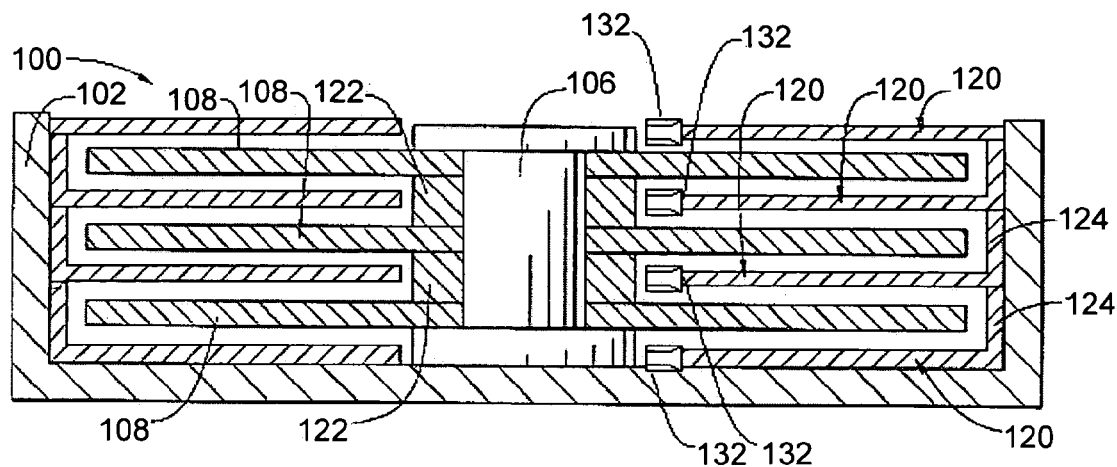
FIG. 2 is an elevational, cross-sectional view of the device of FIG. 1.

FIG. 2 provides an elevational, cross-sectional view of the device 100 to generally illustrate preferred configuration and orientations of the plates 120. It is contemplated that the device 100 includes three axially aligned discs 108 which are separated by two spacers 122. A total of four plates 120 are interposed with the discs 108 as shown with two intermediary plates between the discs 108, one above the discs 108 (visible in FIG. 1) and one below the discs 108. Shroud surfaces 124 are preferably provided to selected ones of the plates 120 to provide fluidic control at the outermost diameters (ODs) of the discs 108.

The separator plates 120 substantially extend adjacent the entire disc surfaces, and are each provided with an open portion 126 to allow access for the actuator assembly 110 to position the heads 112 adjacent the disc surfaces. The plates 120 operate to reduce the flow velocity of the fluidic currents 113 in the open portion 126 near the heads 112, thereby inducing laminar flow and reducing vibrations that can adversely affect head positioning.

The open portions 126 are each defined by a leading edge 128 (downstream from the heads 112) and a trailing edge 130 (upstream from the heads 112). The leading edges 128 are each preferably contoured with an arcuate shape so that the associated head 112 moves in close proximity to the leading edge 128 as the heads 112 are moved across the disc surfaces during operation.

Figure 3:
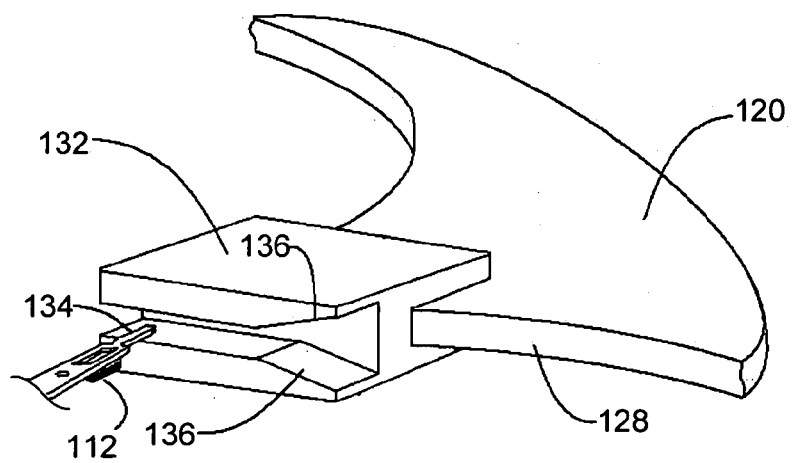
FIG. 3 illustrates a portion of the windage plate of FIGS. 1 and 2 in accordance with some preferred embodiments.

As further shown in FIG. 3, each of the leading edges 128 supports a ramp structure 132 for use when the device 100 enters a deactivated mode. The ramp structure 132 of FIG. 3 is configured to guide the associated head 112 toward or away from the disc 108 during head loading/unloading.

More particularly, the head 112 includes a forward projecting load tab 134 which is contactingly guided along an inclined ramp surface 136 and onto a shelf surface 138 to park (unload) the head 112. This places the head 112 in a safe orientation while the spindle motor 106 is de-energized and the discs 106 are brought to rest. When the device 100 subsequently re-enters an operational mode, the spindle motor 106 is accelerated to a velocity sufficient to hydrodynamically support the heads 112, and the load tab 134 is guided across the shelf surface 138 and down the ramp surface 136 to load the head 112 out over the disc surface 108.

The ramp structure 132 can be fabricated separately from and subsequently affixed to remaining portions of the plate 120 using an overmolding or other suitable process. Alternatively, the entire plate 120 can be formed as a unitary article using an injection molding or other suitable process. The material composition of the ramp structure 132 is preferably selected to provide relatively low wear, particulation and friction characteristics.

The ramp structure 132 in FIGS. 1–3 is shown to be located adjacent the innermost diameter (ID) of the disc 108, although such is not limiting. Rather, the structure can be advantageously located at any suitable location along the leading edge 128, including near the disc OD.

It has been found that use of the ramp structure 132 at the ID can advantageously increase the available data recording area for a skew limited actuator geometry (as in FIG. 1) by allowing movement of the outermost diameter of the data recording zone nearer to the disc OD as compared to conventional ramp designs that provide ramp structures near the OD. This is because such conventional ramp designs generally require that no data be recorded in the load/unload zone (i.e., adjacent the ramp structure). For example, as depicted by Table 1, the configuration exemplified in FIGS. 1–3 has been found to provide an additional 3.8% in the available data area of each disc surface as compared to such conventional OD ramp designs, improving the overall amount of data that can be accommodated by the device 100.

TABLE 1

| | Conventional OD Ramp | Plate with ID Ramp |
| --- | --- | --- |
| Spin to Pivot (inches, in.) | 1.560 | 1.580 |
| Pivot to Gap (in.) | 1.260 | 1.260 |
| Slider Skew | 0.000 | 0.000 |
| Skew at OD (degrees) | 10.0 | 10.0 |
| Skew at ID (degrees) | −10.0 | −10.0 |
| OD Data Radius (in.) | 1.166 | 1.200 |
| ID Data Radius (in.) | 0.726 | 0.759 |
| Data Area (in.²) | 2.615 | 2.714 |
| Data Area Increase | | 3.8% |

While the embodiments described above place the ramp structure 132 on the leading edge 128 of the plate 130 so that the fluidic currents 113 pass across the head 112 prior to reaching the ramp structure 132 (see FIG. 1), such is not necessarily required. For example, FIG. 4 illustrates an alternative placement of the ramp structure 132 along the trailing edge 130 so that the fluidic currents pass the ramp structure 132 prior to reaching the head 112.

Figure 4:
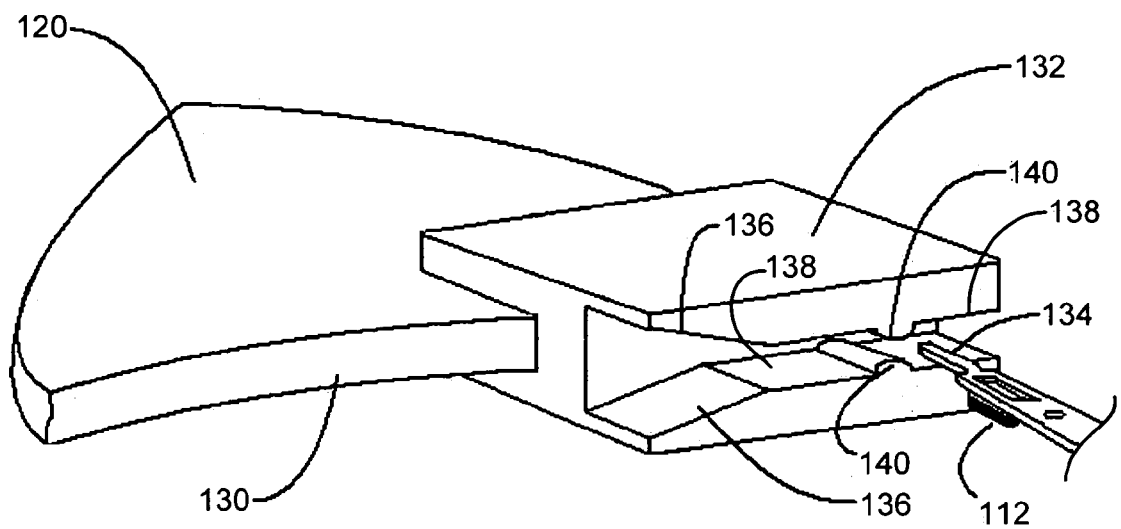
FIG. 4 illustrates the windage plate in accordance with other preferred embodiments.

It will be noted that the ramp structure 132 in FIG. 4 is located near the OD of the discs 108, and further includes a latching feature 140 (bump) which serves to latch, or retain, the load tab 134 on the shelf surface 138.

Figure 5:
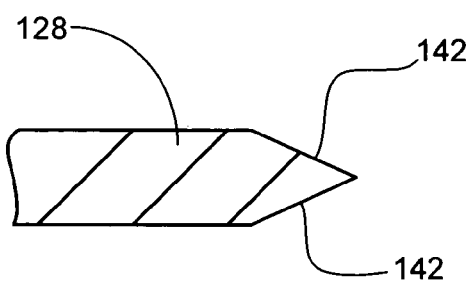
FIGS. 5 and 6 provide cross-sectional views of alternative leading and/or trailing edge profiles of the windage plate.
Figure 6:
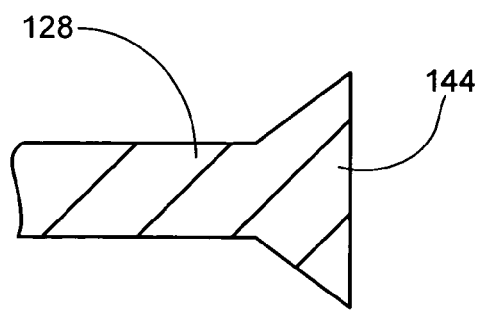

As desired, the leading and/or trailing edges 128, 130 of the plates 120 can be additionally configured to further control the fluidic currents 113. For example, FIG. 5 shows the leading edge 128 with tapered surfaces 142 so that the thickness of the plate 130 tapers to a point. FIG. 6 shows the leading edge 128 with an air dam 144 which provides a localized increase in thickness of the plate 120.

While the foregoing illustrative embodiments have used the plate 120 in the environment of a data storage device, such is not limiting. Rather, the plate can be utilized with any number of different types of rotatable surfaces with access elements including drums, tapes and disc shaped members.

In view of the foregoing discussion, it will now be appreciated that the present invention, as embodied herein and as claimed below, is generally directed to an apparatus which provides improved positional control for an access element moveable adjacent a rotatable surface.

In accordance with some preferred embodiments, the apparatus comprises a circumferentially extending windage plate (such as 120) adapted for placement adjacent a rotatable surface (such as 108), the plate comprising an edge surface (such as 128, 130) configured to extend adjacent a movement path of an access element (such as 112) across the rotatable surface, said edge surface supporting a ramp structure (such as 132) adapted to receivingly support said access element at a position away from the rotatable surface.

In accordance with other preferred embodiments, the apparatus comprises a rotatable surface (such as 108), an access element (such as 112) moveable along a movement path adjacent the rotatable surface, a stationary, circumferentially extending windage plate (such as 120) adjacent the rotatable surface comprising an edge surface (such as 128, 130) disposed adjacent the movement path, and a ramp structure (such as 132) supported by the edge surface which receivingly supports the access element at a position away from the rotatable surface.

For purposes of the appended claims, the recited "first means" will be understood consistent with the foregoing discussion to correspond to the disclosed windage plate 120 which incorporates the ramp structure 132 as depicted in FIGS. 1–6. Structures that fail to circumferentially extend adjacent a substantial portion of the disc, such as localized cantilevered members that support a ramp structure, are expressly excluded from the definition of an equivalent.

It will be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the claimed invention.

What is claimed is:

1. An apparatus comprising at least one windage plate adapted for placement adjacent at least one rotatable surface that is at least partially surrounded by a shroud surface, the plate comprising:

an inner circumference that is in close proximity to an inner edge of the at least one rotatable surface;

an outer circumference that is adjacent the shroud surface;

an edge surface that extends between the inner circumference and the outer circumference of the plate and configured to extend adjacent a movement path of an access element across the rotatable surface, said edge surface supporting a ramp structure adapted to receivingly support said access element at a position away from the rotatable surface;

wherein the edge surface is characterized as a selected one of a leading edge and a trailing edge, wherein the leading edge and the trailing edge cooperate to form a gap area to permit access for the access element; and wherein the ramp structure is supported by said leading edge so that fluidic currents established by rotation of the rotatable surface pass the access element immediately prior to passing the ramp structure.

2. The apparatus of claim 1, wherein the windage plate is configured coaxially adjacent and substantially parallel to said rotating element.

3. The apparatus of claim 1, wherein the rotatable surface is characterized as a recording surface of a data recording disc and the access element is characterized as a data transducing head of a data storage device.

4. The apparatus of claim 1, wherein the access element is hydrodynamically supported by fluidic currents established by rotation of the rotatable surface.

5. The apparatus of claim 1, wherein at least a selected one of the leading and trailing edges comprise a dam comprising a localized increase in thickness as compared to remaining portions of the plate to restrict fluidic flow of fluidic currents established by rotation of said rotatable surface.

6. The apparatus of claim 1, wherein at least a selected one of the leading and trailing edges comprises a tapered surface comprising a localized decrease in thickness as compared to remaining portions of the plate.

7. The apparatus of claim 1, wherein the rotatable surface is characterized as a disc surface having an innermost diameter (ID) and an outermost diameter (OD), and wherein the ramp structure is disposed adjacent a selected one of the ID and OD.

8. The apparatus of claim 1, wherein the ramp structure comprises an inclined surface which is skewed with respect to the movement path of the access element so that the access element passes along the inclined surface as the ramp structure receives said element.

9. An apparatus, comprising:

at least one rotatable surface surrounded at least partially by a shroud surface;

an access element moveable along a movement path adjacent the at least one rotatable surface;

a stationary, extending windage plate adjacent the at least one rotatable surface comprising an inner circumference that is in close proximity to an inner edge of the at least one rotatable surface, an outer circumference adjacent the shroud surface and an edge surface disposed adjacent the movement path that extends between the inner circumference and the outer circumference, wherein the edge surface is characterized as a selected one of a leading edge and a trailing edge, wherein the leading edge and the trailing edge cooperate to form a gap area to permit access for the access element; and a ramp structure supported by the edge surface which receivingly supports the access element at a position away from the rotatable surface, wherein the ramp structure is supported by said leading edge so that fluidic currents established by rotation of the rotatable surface pass the access element immediately prior to passing the access element.

10. The apparatus of claim 9, wherein the rotatable surface is characterized as a recording surface of a data recording disc and the access element is characterized as a data transducing head of a data storage device.

11. The apparatus of claim 9, wherein the access element is hydrodynamically supported by fluidic currents established by rotation of the rotatable surface.

12. The apparatus of claim 9, wherein the rotatable surface is characterized as a disc surface having an innermost diameter (ID) and an outermost diameter (OD), and wherein the ramp structure is disposed adjacent a selected one of the ID and OD.

13. The apparatus of claim 1, wherein the ramp structure comprises an inclined surface which is skewed with respect to the movement path of the access element so that the access element passes along the inclined surface as the ramp structure receives said element.

14. The apparatus of claim 9, wherein the inner circumference of the plate comprises a circular inner circumference and the outer circumference of the plate comprises a circular outer circumference.

15. The apparatus of claim 9, wherein at least a selected one of the leading and trailing edges comprise a dam comprising a localized increase in thickness as compared to remaining portions of the plate to restrict fluidic flow of fluidic currents established by rotation of said rotatable surface.

16. The apparatus of claim 9, wherein at least a selected one of the leading and trailing edges comprises a tapered surface comprising a localized decrease in thickness as compared to remaining portions of the plate.

* * * * *